Jan. 7, 1964                I. M. McNAIR, JR                3,117,238
VOLTAGE DETECTOR UTILIZING OPPOSITE CONDUCTIVITY
TYPE TRANSISTORS AND ZENER DIODES
Filed Aug. 25, 1960

INVENTOR
I. M. MC NAIR, JR.
BY
ATTORNEY

United States Patent Office 3,117,238
Patented Jan. 7, 1964

3,117,238
VOLTAGE DETECTOR UTILIZING OPPOSITE CONDUCTIVITY TYPE TRANSISTORS AND ZENER DIODES
Irving M. McNair, Jr., Scotch Plains, N.J., assignor to Bell Telephone Laboratories, Incorporated, New York, N.Y., a corporation of New York
Filed Aug. 25, 1960, Ser. No. 51,860
8 Claims. (Cl. 307—88.5)

This invention relates to signal detection circuits and, more particularly, to semiconductor detecting circuits responsive to a discrete range of direct-current voltages.

It is often desirable to know whether a particular voltage falls within or outside of a preselected range of voltages. A circuit for detecting this condition can, for example, be used to monitor the output of signal generators or any other circuits to produce an output indicative of the condition of the circuit. More particularly, such a monitor can be connected to a telephone line and its output used as an indication of whether or not the line is in use.

It is an object of the present invention to reduce the size, cost and complexity of voltage detecting circuits.

It is another object of the invention to provide a voltage detection circuit producing an output of one kind if an applied voltage falls within a discrete range of voltages, and to provide an output of another kind if an applied voltage falls outside of this range.

In accordance with the present invention, a voltage divider is connected across the source of voltages to be detected. Intermediate points on this voltage divider are connected to the base electrodes of at least two transistors which are of opposite conductivity types. Threshold breakdown devices may be connected between these taps and the base electrodes to provide reference voltages for the detecting circuit. An output circuit is connected in series with the collector-emitter paths of the two transistors.

It can be seen that the output circuit will be energized only when both of the transistors are in a conducting condition. When one or the other or both of these transistors are cut off, no output will appear. If positive voltages are being monitored, it can be seen that the n-p-n transistor will become forward-biased as soon as the breakdown device in its base circuit begins to conduct current. Similarly, when monitoring a positive voltage, the p-n-p transistor can be arranged to conduct current until the breakdown device in its base circuit conducts current, at which time it will be cut off.

From the above description, it can be seen that both transistors are On and conducting current only between the two reference levels set by the breakdown devices. Below this range the n-p-n transistor is biased Off and above this range the p-n-p transistor is biased Off. The limits of the range can be set individually by appropriately selecting the breakdown voltages of the breakdown devices and the position of this range on the voltage scale can be set by the scaling ratio of the voltage divider.

The present invention, therefore, provides a simple, easily adjustable voltage range detector useful for many applications involving direct-current voltage monitoring. The circuit of the present invention may also be used for alternating-current voltages simply by inserting a full wave rectifier before the detection circuit.

These and other objects and features, the nature of the present invention and its various advantages, may be more readily understood from the attached drawing and the following detailed description of the drawing.

Figure 1:
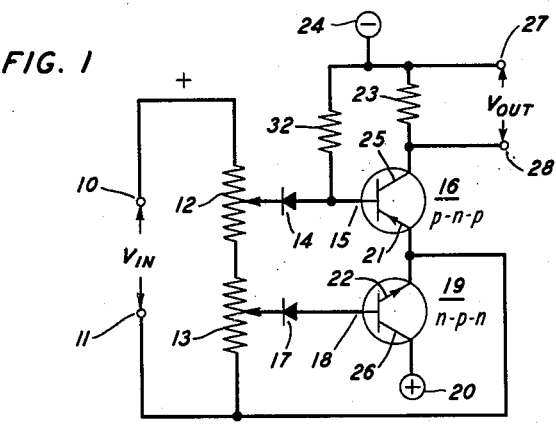
FIG. 1 is a schematic diagram of a voltage detection circuit in accordance with the present invention.

Referring more particularly to FIG. 1, there is shown a voltage detection circuit comprising input terminals 10 and 11 to which the voltage to be detected is applied. Connected across terminals 10 and 11 in series are two potentiometers 12 and 13 forming a voltage divider. A semiconductor junction diode 14, of the so-called "Zener type," connects the movable tap of potentiometer 12 to the base electrode 15 of p-n-p transistor 16. Similarly, a semiconductor junction diode 17, also of the "Zener type," connects the center tap of potentiometer 13 to the base electrode 18 of n-p-n transistor 19. Input terminal 11 is also connected to the emitter electrodes 21 and 22 of transistors 16 and 19, respectively.

A negative voltage source 24 is connected by way of load resistor 23 to collector 25 of transistor 16. A positive voltage source 20 is connected to collector 26 of transistor 19. An output is derived across load resistor 23 between terminals 27 and 28.

The circuit of FIG. 1 operates as follows. When the voltage applied between terminals 10 and 11 is of a negative value or zero, the voltage applied to base 18 of transistor 19 is of such a polarity as to reverse-bias transistor 19. Such a negative voltage, however, will forward-bias transistor 16. Under this condition, therefore, transistor 19 is cut off and transistor 16 is conducting. Since current is supplied to load resistor 23 only through the series combination of the collector-emitter paths of transistors 16 and 19, little or no output will appear across terminals 27 and 28.

As the voltage across terminals 10 and 11 increases in a positive direction, transistor 16 remains in the conducting condition due to the biasing action of sources 20 and 24 through the biasing resistor 32. Transistor 19, however, will not begin to conduct until the voltage at the tap of potentiometer 13 is sufficient to break down diode 17 and apply a forward-biasing current to base 18. This voltage is determined by the breakdown voltage of diode 17 and the voltage dividing action of potentiometers 12 and 13. Assuming that diode 14 remains in the nonconducting condition, transistor 16 will also continue to conduct. The series path through the collectors and emitters of transistors 16 and 19 is therefore complete and a substantial voltage drop will appear across resistor 23.

Figure 2:
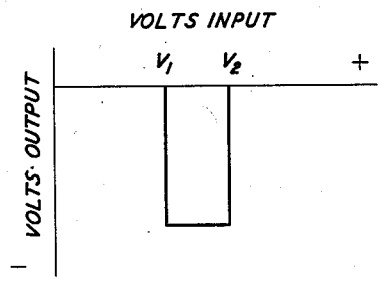
FIG. 2 is a graphical illustration of the output versus input characteristic of the circuit of FIG. 1.

This can be seen in FIG. 2 which shows the graphical representation of the output versus input voltages of the circuit of FIG. 1. At the voltage $V_1$, corresponding to the voltage at which diode 17 breaks down, the output voltage abruptly changes to a relatively large negative value. If the bias levels and the transistors are properly chosen, this condition will cause both transistors to saturate and a substantially constant current will be delivered through load resistor 23.

At some higher input voltage (corresponding to voltage $V_2$ in FIG. 2) diode 14 will break down and apply a current to the base 15 of transistor 16 in such a direction as to cut off transistor 16. Since the load circuit is now interrupted the output voltage across load resistor 23 abruptly returns to zero or a low value and remains at this value regardless of how high the input voltage rises until, of course, the breakdown voltage of transistor 16 is reached. Transistor 19 will continue to conduct throughout this higher range of input voltages.

The circuit of FIG. 1 is therefore suitable for detecting a discrete range of voltages in a larger range of input voltages and for producing an output of one kind (a negative voltage) when the input voltage falls within this range and for producing an output of a second kind (zero voltage) for all input voltages outside of the range. The limits of the detection range may be individually set by choosing the individual breakdown voltages for diodes 14 and 17. It is to be understood, however, that breakdown devices other than Zener diodes will be equally suitable in the circuit of FIG. 1. Standard semiconductor diodes, gas tubes, vacuum diodes and many other types of breakdown devices will be equally suitable.

It will be further noted that, although the circuit of FIG. 1 is arranged to monitor a range of positive direct-current voltages, the simple addition of a full-wave rectifier will render the circuit of FIG. 1 suitable for monitoring the magnitude of positive and negative voltages as well as alternating-current voltages.

Figure 3:
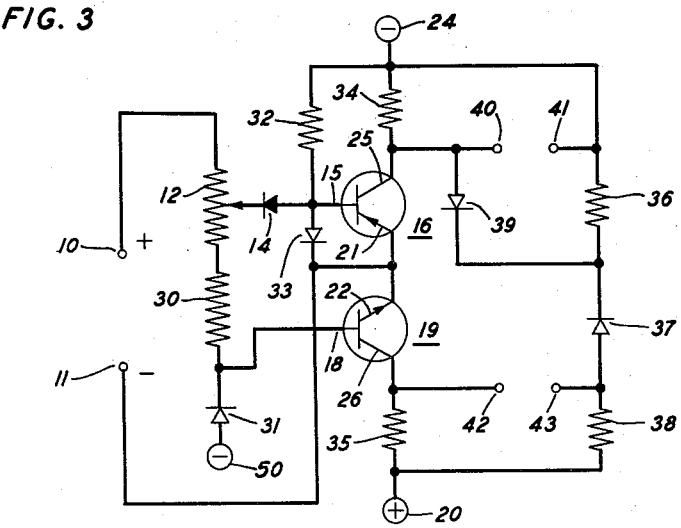
FIG. 3 is a schematic diagram of another embodiment of the present invention.

Referring more particularly to FIG. 3, there is shown another embodiment of the invention in which similar components have been identified with the same reference numerals. Thus, in FIG. 3 the voltage to be detected is applied between terminals 10 and 11. Connected to terminal 10 and reference voltage source 50 is a voltage divider comprising potentiometer 12, resistor 30 and diode 31. The movable tap on potentiometer 12 is connected by way of semiconductor Zener diode 14 to the base 15 of p-n-p transistor 16. The point intermediate between resistor 30 and diode 31 is connected directly to the base 18 of n-p-n transistor 19. A biasing resistor 32 connects the base 15 of transistor 16 to negative voltage source 24. A diode 33 is connected across the base-emitter circuit of transistor 16 and is poled oppositely to the base-emitter junction.

The collector-emitter paths of transistors 16 and 19 are connected in series with load resistors 34 and 35 between supply sources 20 and 24. A voltage divider comprising resistor 36, diode 37 and resistor 38 is also connected between sources 20 and 24. Diode 39 is connected between the collector 25 of transistor 16 and the point between resistor 36 and diode 37.

Two outputs may be obtained from the circuit of FIG. 3. One output is taken between terminals 40 and 41 connected across resistor 34. The output at these terminals is similar to the output of the circuit of FIG. 1, that is, zero volts outside of the detection range and a negative voltage within the range. A second output may be derived in FIG. 3 between terminals 42 and 43. This output comprises a positive voltage outside of the detection range and a negative voltage within the detection range. The output voltage across terminals 42 and 43 may be more suitable for many purposes although it provides the same information as the output at terminals 40 and 41.

The circuit of FIG. 3 operates as follows: When the voltage applied across terminals 10 and 11 is negative or zero volts, transistor 19 is reverse-biased and hence in a non-conducting state. Transistor 16 is forward-biased through resistor 32 by sources 20 and 24 and thus is in a conducting condition. Since transistor 19 is cut off, no current flows through load resistors 34 and 35. The output of terminals 40 and 41 is therefore zero.

Diode 37 is a reference diode having a constant voltage drop when conducting in the forward direction. Diode 37 is forward-biased through the voltage divider including a resistor 36, diode 37 and resistor 38. Since the upper electrode of diode 39 is essentially at the potential of source 24, while the lower electrode is at a more positive value, due to the voltage drop across resistor 36, diode 39 remains reverse-biased. The reference voltage provided by diode 37 is chosen to provide a suitable positive voltage between terminals 42 and 43 under this condition.

As the input voltage across terminals 10 and 11 continues to rise, the current flowing through the series path including potentiometer 12, resistor 30 and the base-emitter circuit of transistor 19 eventually becomes large enough to forward-bias transistor 19. Assuming that Zener diode 14 remains cut off at this point, transistors 16 and 19 are now both conducting and a substantial current flows from source 20 through load resistors 34 and 35. The voltage at collector 25 of transistor 16 therefore increases in a positive direction. That is, the voltage drop across resistor 34 raises the voltage level at the upper electrode of diode 39 and diode 39 becomes forward-biased. The resulting increased voltage at the upper electrode of diode 37 reverse biases this diode and cuts it off. The voltage between terminals 42 and 43 is then essentially only the drop across resistor 35 and hence assumes a negative polarity. Resistor 32 permits a base current to flow in transistor 16 which holds transistor 16 in saturation at this time.

As the input voltage applied to terminals 10 and 11 continues to rise, ultimately the voltage across breakdown diode 14 becomes large enough to break this diode down and deliver current to base 15 of transistor 16 in such direction as to cut transistor 16 off. Although transistor 19 continues to conduct for these higher input voltages, the output circuit is interrupted, the current through resistors 34 and 35 goes to zero, the voltage across resistor 34 (at terminals 40 and 41) goes to zero and diode 39 again becomes reverse-biased. Diode 37 is again forward-biased and the voltage between terminals 42 and 43 therefore returns to a positive value. As the input voltage continues to increase the diode 33 shunts current around the base-emitter path of transistor 16 and thus protects this transistor from excessive voltages which might otherwise cause breakdown.

The circuit of FIG. 3 operates in essentially the same manner as the circuit of FIG. 1 except for the fact that the lower threshold of detection is obtained from the cut-off threshold of transistor 19 rather than an external breakdown device. That is, potentiometer 12 and resistor 30 are chosen to be of such values that insufficient current will flow through the base-emitter path of transistor 19 to turn on transistor 19 until the voltage across terminals 10 and 11 reaches a desired value. In this way, the lower threshold of detection may be substantially lower than it might be possible to provide with simple breakdown devices. The upper threshold in the circuit of FIG. 3 is provided in substantially the same manner as in FIG. 1.

In FIG. 3 there is also provided a circuit for obtaining a variety of output voltage levels within and outside of the detected voltage range. It is well known that many two-state voltage-responsive circuits may be more readily implemented when driven by particular voltage changes. A diode switch, for example, may be more readily turned off and on by a control voltage which varies between positive and negative values rather than one that varies between zero and some other value. Moreover, as seen in FIG. 3, a plurality of different types of outputs may be derived from the same detection circuit simultaneously to control a variety of different circuits responsive to different voltage conditions.

It is to be understood that the above described arrangements are merely illustrative of the numerous and varied other arrangements which may constitute applications of the principles of the invention. Such other arrangements may readily be devised by those skilled in the art without departing from the spirit or scope of the invention.

What is claimed is:

1. A voltage range sensing circuit comprising a source of voltage to be sensed, a plurality of series connected impedance elements connected to said source of voltage to provide a voltage divider, a plurality of transistors at least some of which are of opposite conductivity types, means for connecting the base electrodes of said transistors to individual ones of said impedance elements, a load circuit, a source of energizing potential, and means for connecting said load circuit and said source of energizing potential in a series circuit including the collector-emitter paths of all of said transistors, two adjacent electrodes in said series circuit forming a node common to said source of voltage.

2. The voltage range sensing circuit according to claim 1 wherein said means for connecting said base electrodes to said impedance elements each comprise a voltage breakdown device.

3. In combination, a source of variable voltage which may have any value in a broad range of values, and circuit means for producing an indication when said source has a value within a limited range of values smaller than said broad range, said circuit means comprising a first transistor and a second transistor, said first and second transistors being of opposite conductivity types, a source of reference voltage, output means, means connecting said source of voltage and said output means in a series circuit including the collector-emitter paths of said first and second transistors, the adjacent electrodes of said transistors in said series circuit being joined to a common node, and voltage-sensitive means connecting the base electrodes of each said first and second transistors to said source of variable voltage, said base electrodes being connected to different voltage levels produced by said voltage sensitive means.

4. A combination according to claim 3 wherein said voltage-sensitive means connecting said base electrodes to said source of variable voltage comprises a voltage divider connected across said source of variable voltage, and voltage breakdown means connecting an intermediate point on said voltage divider to the base electrode of one of said first and second transistors.

5. A voltage responsive circuit comprising a source of variable voltage, a voltage divider connected across said source of variable voltage, a plurality of transistors at least some of which are of opposite conductivity types, voltage breakdown means for connecting the base electrodes of said transistors to various different points on said voltage divider, load means, and means connecting the collector-emitter paths of said transistors in series with said load means.

6. In combination, a single source of voltage of indeterminate magnitude, two transistors, one of which is of the p-n-p type and the other which is of the n-p-n type, voltage dividing means connected across said single source of voltage, voltage breakdown means connecting the base electrodes of each of said transistors to different tapping points on said voltage dividing means, a source of reference potential, impedance means, means connecting said source of reference potential and said impedance means in series with the collector-emitter paths of said two transistors.

7. The combination according to claim 6 in which said voltage-sensitive means connecting the base electrodes of said two transistors to said source of voltage each comprise a semiconductor junction diode having a constant voltage breakdown characteristic.

8. The combination according to claim 6 further including voltage divider means including a constant voltage reverse breakdown junction diode, means for connecting said voltage divider across said source of reference potential and means for deriving an output between one junction of said reverse breakdown junction diode and the collector electrode of one of said transistors.

References Cited in the file of this patent

UNITED STATES PATENTS

| | | |
|---|---|---|
| 2,887,619 | Hussey et al. | May 19, 1959 |
| 2,930,942 | Levine et al. | Mar. 29, 1960 |
| 2,938,174 | Bulleyment | May 24, 1960 |
| 2,947,882 | Chou | Aug. 2, 1960 |
| 2,965,767 | Wanlass | Dec. 20, 1960 |